United States Patent
Agrawal et al.

(10) Patent No.: US 12,141,248 B2
(45) Date of Patent: Nov. 12, 2024

(54) SYSTEMS AND METHODS FOR WHITEBOX DEVICE BINDING

(71) Applicant: Visa International Service Association, San Francisco, CA (US)

(72) Inventors: Shashank Agrawal, Sunnyvale, CA (US); Estuardo Alpirez Bock, San Francisco, CA (US); Yilei Chen, San Francisco, CA (US); Gaven James Watson, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 173 days.

(21) Appl. No.: 17/907,919

(22) PCT Filed: May 14, 2021

(86) PCT No.: PCT/US2021/032475
§ 371 (c)(1),
(2) Date: Aug. 29, 2022

(87) PCT Pub. No.: WO2021/236446
PCT Pub. Date: Nov. 25, 2021

(65) Prior Publication Data
US 2023/0124498 A1    Apr. 20, 2023

Related U.S. Application Data

(60) Provisional application No. 63/027,208, filed on May 19, 2020.

(51) Int. Cl.
*G06F 21/14* (2013.01)
*G06F 21/64* (2013.01)
(Continued)

(52) U.S. Cl.
CPC .............. *G06F 21/14* (2013.01); *G06F 21/64* (2013.01); *H04L 9/0825* (2013.01);
(Continued)

(58) Field of Classification Search
CPC ...... G06F 21/14; G06F 21/64; G06F 21/1011; G06F 21/51; G06F 21/54; G06F 21/57;
(Continued)

(56) References Cited

U.S. PATENT DOCUMENTS 8,510,726 B2    8/2013  Eisen et al.
9,152,798 B1    10/2015 Drewry et al.
(Continued)

FOREIGN PATENT DOCUMENTS

CN        107317807 A    11/2017

OTHER PUBLICATIONS

EP21809414.2, "Extended European Search Report", Sep. 26, 2023, 5 pages.
(Continued)

*Primary Examiner* — Henry Tsang
(74) *Attorney, Agent, or Firm* — Kilpatrick Townsend & Stockton LLP

(57) ABSTRACT

A method is disclosed. The method includes receiving, by a user device, an encrypted message from a server computer. The encrypted message is a message encrypted with a master secret key or a key derived from the master secret key. The user device signs the encrypted message with a secure element private key. The user device, using a whitebox, cryptographically recovers a secure element public key from a certified key using a server computer public key. The certified key is certified by the server computer and based on at least the secure element public key. The user device, using the whitebox, cryptographically recovers the encrypted message from the signed encrypted message using the secure
(Continued)

element public key. The user device, using the whitebox, decrypts the encrypted message using the master secret key or the key derived from the master secret key in the whitebox to obtain the message.

20 Claims, 5 Drawing Sheets

(51) Int. Cl.
*H04L 9/08* (2006.01)
*H04L 9/32* (2006.01)
*G06F 21/10* (2013.01)

(52) U.S. Cl.
CPC .......... *H04L 9/0866* (2013.01); *H04L 9/0894* (2013.01); *H04L 9/3247* (2013.01); *G06F 21/1011* (2023.08); *H04L 2209/16* (2013.01)

(58) Field of Classification Search
CPC ... H04L 9/0825; H04L 9/0866; H04L 9/0894; H04L 9/3247; H04L 2209/16
See application file for complete search history.

(56) References Cited

U.S. PATENT DOCUMENTS

| | | |
|---|---|---|
| 2007/0083766 A1 | 4/2007 | Farnham et al. |
| 2013/0024699 A1 | 1/2013 | Muir et al. |
| 2014/0006803 A1* | 1/2014 | Bodis .................. H04L 9/3247 |
| | | 713/189 |
| 2014/0189853 A1 | 7/2014 | Epp et al. |
| 2015/0280921 A1 | 10/2015 | Geoffrey |
| 2017/0063975 A1* | 3/2017 | Prakash .................. G06F 21/73 |
| 2018/0048459 A1 | 2/2018 | Ding |
| 2019/0312718 A1* | 10/2019 | Michiels ................ G06F 21/75 |
| 2019/0364021 A1 | 11/2019 | Mitchell |
| 2020/0076614 A1 | 3/2020 | Georgieva et al. |

OTHER PUBLICATIONS

Application No. PCT/US2021/032475, International Search Report and Written Opinion, Mailed On Aug. 31, 2021, 8 pages.

Bock et al., "On the Security Goals of White-Box Cryptography", ACR Transactions on Cryptographic Hardware and Embedded Systems, vol. 2020, No. 2, Mar. 2020, pp. 1-38.

Gu et al., "White-Box Cryptography: Practical Protection on Hostile Hosts", SSPREW '16: Proceedings of the 6th Workshop on Software Security, Protection, and Reverse Engineering, Article No. 4, Dec. 2016, pp. 1-8.

* cited by examiner

SYSTEMS AND METHODS FOR WHITEBOX DEVICE BINDING

CROSS-REFERENCES TO RELATED APPLICATIONS

The present application is a U.S. National Stage of PCT application No. PCT/US2021/032475, filed on May 14, 2021 which claims priority to U.S. Provisional Application 63/027,208, filed on May 19, 2020, both of which are incorporated herein by reference for all purposes in their entirety.

BACKGROUND

Whitebox cryptography was introduced in the context of digital rights management (DRM) applications [4] [5]. In a scenario, a provider provides software programs that let a user access specific content. The content can be sent out by the provider in an encrypted form and the software of the user is configured with a corresponding decryption key, such that every user who has a software program is able to decrypt the content. In this context, the decryption key corresponds to the content the users have paid for (e.g., the streaming package the user bought). Note that many users usually have software configured with the same decryption key, because they have paid for the same content (e.g., for the same package).

However, a malicious user who has obtained the software including the decryption key can share the DRM application with other users. Moreover, the malicious user could attempt to make numerous copies of the software and sell them on the black market. To achieve this, the malicious user could attempt to extract the decryption key from their program, and then share that key with other users. The malicious user could also attempt to simply copy the complete software with the embedded key on it, thus performing a code-lifting attack. To achieve these goals the malicious user can inspect the code of the software and collect input/output pairs. Note that the malicious user can be in full control of the execution environment since the software is running on their own device.

Currently methods exist for making it difficult for the malicious user to send their program over the network (e.g., incompressibility property [6]). Additionally, current methods attempt to make the whitebox programs traceable. For example by watermarking the programs such that if a copy of the program is found (e.g., on the black market), the original owner of the program can be identified along with their attempts at piracy. Examples of traitor tracing schemes are given in: [3] [6].

However, such methods do not stop the malicious user from copying the code and/or keys using a code lifting attack.

Embodiments of the disclosure address this problem and other problems individually and collectively.

SUMMARY

Embodiments are related to methods and systems for whitebox device binding.

One embodiment of the invention can be related to a method comprising: receiving, by a user device, an encrypted message from a back-end server computer, the encrypted message being a message encrypted by the back-end server computer with a master secret key or a key derived from the master secret key; signing, by the user device, using a secure element, the encrypted message with a secure element private key to obtain a signed encrypted message; cryptographically recovering, by the user device, using a whitebox, a secure element public key from a certified key using a back-end server computer public key, the certified key being certified by the back-end server computer and based on at least the secure element public key, and wherein the whitebox also stores the master secret key or the key derived from the master secret key; cryptographically recovering, by the user device, using the whitebox, the encrypted message from the signed encrypted message using the secure element public key; and decrypting, by the user device, using the whitebox, the encrypted message using the master secret key or the key derived from the master secret key in the whitebox to obtain the message.

Another embodiment of the invention can be related to a user device comprising: a processor; and a computer-readable medium coupled to the processor, the computer-readable medium comprising code executable by the processor for implementing a method comprising: receiving an encrypted message from a back-end server computer, the encrypted message being a message encrypted by the back-end server computer with a master secret key or a key derived from the master secret key; signing, using a secure element, the encrypted message with a secure element private key to obtain a signed encrypted message; cryptographically recovering, using a whitebox, a secure element public key from a certified key using a back-end server computer public key, the certified key being certified by the back-end server computer; cryptographically recovering, using the whitebox, the encrypted message from the signed encrypted message using the secure element public key; and decrypting, using the whitebox, the encrypted message using the master secret key or a key derived from the master secret key to obtain the message.

Another embodiment of the invention can be related to a method comprising: receiving, by a back-end server computer, an enrollment message including a secure element public key from a user device that has installed an application compiled by the back-end server computer; signing, by the back-end server computer, the secure element public key with a back-end server computer private key to form a certified key; providing, by the back-end server computer, the certified key to the user device; obtaining, by the back-end server computer, a message comprising content to provide to the application installed on the user device; encrypting, by the back-end server computer, the message with a master secret key or a key derived from the master secret key to obtain an encrypted message; and providing, by the back-end server computer, the encrypted message to the user device, wherein the user device, using a secure element, signs the encrypted message with a secure element private key to obtain a signed encrypted message, cryptographically recovers, using a whitebox in the application, the secure element public key from the certified key using a back-end server computer public key, cryptographically recovers, using the whitebox, the encrypted message from the signed encrypted message using the secure element public key, and decrypts, using the whitebox, the encrypted message using the master secret key or a key derived from the master secret key to obtain the message.

Further details regarding embodiments of the invention can be found in the Detailed Description and the Figures.

DETAILED DESCRIPTION

Figure 1:
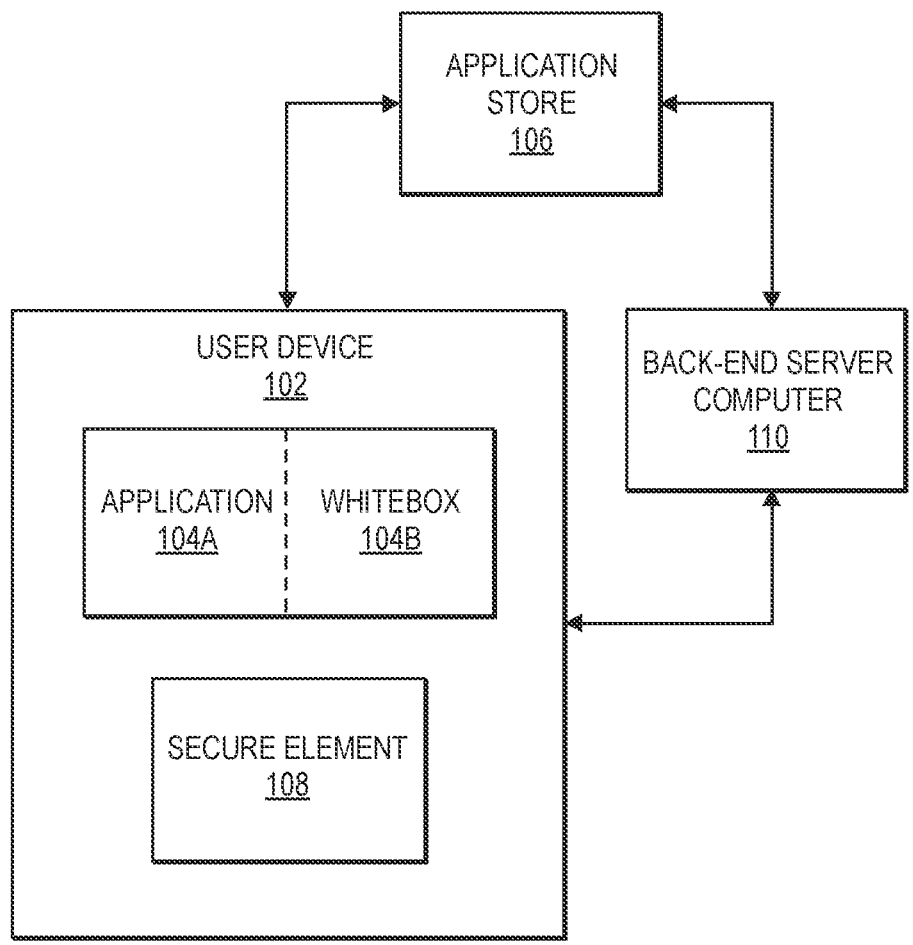
FIG. 1 shows a block diagram illustrating a whitebox device binding system, according to embodiments of the invention.

Prior to discussing embodiments of the disclosure, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that can be operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

An "application" may be a computer program that can be used for a specific purpose. An application can be obtained from an application store. An application can be installed on a device. Examples of applications include an interaction application, a video streaming application, a data transfer application, a webpage access application, a social media application, a word processor, a spreadsheet program, a web browser, an email client, a video game, a photo editor, etc.

A "whitebox" can include a subsystem whose internals can be viewed. A whitebox can be software included in an application. A whitebox can be viewed but not easily altered.

A "public key" can include a cryptographic key that can be utilized publicly. A public key can be obtained and used by anyone to encrypt messages intended for a particular recipient, such that the encrypted messages can be deciphered only by using a second key that is known only to the recipient (e.g., the secret key). A public key can be used to verify a signature made by the secret key associated with the public key.

A "secret key" can include a cryptographic key that can be utilized in secret by a device. A secret key can be kept internally to a single device. A secret key may not be provided to other devices. A secret key can be used to decrypt an encrypted message that is encrypted with the public key associated with the secret key. The secret key can be used to sign a message, thus forming a digital signature. The digital signature can be verified by the public key associated with the secret key.

A "master secret key" can include symmetric cryptographic key. A master secret key can be used to create a secure communication channel between two devices that know (i.e., have stored) the master secret key.

A "secure element" can include secure hardware or software element. A secure element can be protected from unauthorized access and can run processes securely. A secure element can store confidential and cryptographic data. A secure element can be a tamper-resistant hardware platform such as a chip on a device. A secure element can be a tamper-resistant software program such as a virtual or emulated environment (e.g., host card emulation (HCE), etc.).

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

A "cryptogram" may include a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV (dynamic card verification value).

In embodiments of the invention, a cryptogram can be generated in any suitable manner. In some embodiments, the input to the cryptogram can include data elements including an account identifier such as primary account number, and a variable data element such as a counter, a time of day, or interaction value. Such data may be included using an encryption process such as DES, triple DES, or AES using any suitable encryption keys. The encryption keys may also be UDKs or unique derived keys, and may be generated based upon device specific information such as an account number, which may be encrypted using a master derivation key (MDK). The cryptogram can be verified by another computer such a remote computer by either decrypting the cryptogram to and verifying the decrypted contents with other data (e.g., an account number stored on file), or by encrypting other inputs and then comparing the encrypted result to the cryptogram.

A "resource provider" may be an entity that can provide a resource such as goods, services, information, and/or access. Examples of resource providers includes merchants, data providers, transit agencies, governmental entities, venue and dwelling operators, etc.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the disclosure provide for whitebox device binding for both digital rights management (DRM) applications and interaction applications. However, it is understood that embodiments provide for whitebox device binding for other types of applications.

Whitebox cryptography can be used in settings where secure hardware can be limited and thus much of the program can be implemented in software. In such a setting, device binding can be utilized to ensure that sensitive parts of the program cannot be duplicated and run in other environments (e.g., as done in a code-lifting attack).

Embodiments allow for distribution of whitebox applications in an efficient manner. A trusted back-end server computer can compile a whitebox application (e.g., an application comprising a whitebox) once and distribute the application through an application store. All users can download the same program, rather than the back-end server computer needing to compile different applications for different users or groups of users. However, each program needs to be configured to work only on one specific device to mitigate code-lifting attacks. Depending on the application, each application might also need to use a different decryption key. For example, if the application is an interaction application, then each user may need a different decryption key in their installed application, such that one user cannot decrypt another user's content. Embodiments herein demonstrate how to use whitebox cryptography and different obfuscation techniques to achieve this.

Furthermore, for interaction applications, whitebox cryptography can serve a somewhat different purpose than in DRM based applications (e.g., video streaming applications, etc.). There are a variety of different types of user devices (e.g., mobile phones) available to users. With this variety comes a lot of variation within that hardware. Many have secure elements (SEs), which can be used to perform sensitive cryptographic tasks. However, these SEs provide limited functionality and are not available on all phones. To support mobile interactions on phones without trusted hardware, "host card emulation" (HCE) was introduced. Embodiments can be utilized regardless of the type of secure hardware and/or software included in the user device.

Mobile interaction HCE applications store user-related keys (e.g., limited use keys (LUKs)). These keys are stored in encrypted form. Whenever a user wants to perform an interaction, the user's user device takes an encrypted limited use key, decrypts it and uses it to generate a cryptogram. The cryptogram is used to authenticate the user's user device and enables the interaction to proceed. Here, embodiments can ensure that only the user device that holds those limited use keys is able to decrypt them, and that no one other device is able to perform an interaction using them. Whitebox cryptography can be used to provide protection against an adversary (e.g., in the form of malware) who has compromised the user device of the user.

Malware can be on the user's user device without the user knowing it. The malware could access the program code decrypting the limited use keys. Without further protections, an adversary might recover the decryption key and then decrypt the limited use keys. The adversary could also attempt to perform a code-lifting attack by simply copying the complete application with the encrypted limited use keys and running the program on their own device. Note that in a worst case scenario, the adversary might gain root access to the user device and might be able to execute the interaction application of the user.

To mitigate the attack described above, embodiments can protect the cryptographic keys using whitebox cryptography as well as bind the application to the secure element of the user device. Whitebox cryptography can help prevent an adversary from simply reading out the value of the decryption key, from copying the complete application and running it on a device of their choice, and/or from breaking confidentiality of the encrypted limited use keys. Note that the limited use keys that are used in embodiments are user-linked, and only one determined user should be able to decrypt and use them. Therefore, in embodiments of the invention, each interaction application can be configured with a different whitebox decryption key, specific to each user.

As discussed above, code-lifting attacks are a concern in both the DRM and interaction settings. To mitigate these attacks, embodiments can ensure that a whitebox program can only be run on an intended device. To do this, embodiments can use some form of device binding.

In the DRM setting, device binding ensures that a malicious user cannot take their whitebox program and distribute it to others for them to use without themselves registering and/or paying for access to the application. Here, due to device binding, the whitebox program may only be usable on the device for which the user is registered.

In the DRM setting, the encrypted data can be the same for all users. In contrast, in interactions according to embodiments, each user will have a different input to their whitebox program (the limited use keys associated to them). Therefore, device binding in this case can ensure that a whitebox program can be 1) only bound to the device, and can 2) only be run on inputs which are specific to that user. This additional property can be referred to as "authentication binding," where one objective is to bind the mobile application to a specific user. This can ensure that only the owner of the limited use keys can be able to decrypt and use them.

Security notions for whitebox cryptography for the use case of mobile-interaction applications have been studied in [1] [2]. The central notions rely on these properties of (device) hardware-binding. This, and other previous works, however, only provide schemes that require a specific whitebox application to be created for each individual user. The practicality of generating and distributing these user-specific whiteboxes can be severely limiting. Embodiments improve upon on this by introducing schemes which provide device and authentication binding when distributing a single global whitebox, suitable for all users.

FIG. 1 shows a system according to embodiments of the disclosure. The system comprises a user device 102 that comprises an application 104A including a whitebox 104B. The user device 102 can also include a secure element 108. The system can further include a back-end server computer 110 (also referred to as a back-end or BE) and an application store 106. The application store 106 may be run on an application server computer.

The user device 102 can be in operative communication with the application store 106 and the back-end server computer 110. The back-end server computer 110 can be in operative communication with the user device 102 and the application store 106. The application store 106 can be in operative communication with the user device 102 and the back-end server computer 110.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network that may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 102 can include, for example, a mobile device. The user device 102 can communicate with the application store 106 to download then install applications (e.g., application 104A including the whitebox 104B). The user device 102 can also include the secure element 108 which can be secure from malicious tampering. The secure element 108 can create cryptographic keys and perform cryptographic operations. The application 104A can be an application that includes the whitebox 1046. For example, the application 104A can be an interaction application, a streaming application, an a communication application, an access application, etc.

The application store 106 can host one or more applications for the user device 102 to download. In some embodiments, the application store 106 can include one or more server computers. In other embodiments, the application store 106 can be a cloud storage system. The application store 106 can provide an application to the user device 102 upon request.

The back-end server computer 110 can create application (s) and whitebox(es). For example, the back-end server computer 110 can compile a whitebox with suitable cryptographic keys, as described herein. The back-end server computer 110 can comprises a processor and a computer readable medium coupled to the processor, The computer readable medium may comprise code, executable by the processor to perform a method including: obtaining, by a back-end server computer, a message comprising content to provide to an application installed on a user device; encrypting, by the back-end server computer, the message with a master secret key or a key derived from the master secret key to obtain an encrypted message; and providing, by the back-end server computer, the encrypted message to the user device, wherein the user device, using a secure element, signs the encrypted message with a secure element private key to obtain a signed encrypted message, cryptographically recovers, using a whitebox in the application, a secure element public key from a certified key using a back-end server computer public key, cryptographically recovers, using the whitebox, the encrypted message from the signed encrypted message using the secure element public key, and decrypts, using the whitebox, the encrypted message using the master secret key or the key derived from the master secret key to obtain the message After obtaining the application 104A from the application store 106, the user device 102 can enroll the downloaded application with the back-end server computer 110 that compiled the application 104A. For example, the user device 102 can provide a secure element public key, which is generated by the secure element 108, and/or a user identifier to the back-end server computer 110 for enrollment.

Once enrolled, the back-end server computer 110 can provide content to the application 104A on the user device 102. For example, the content can include videos, images, limited use keys, and/or any data utilized by the application 104A.

As noted above, the architecture can include the following three parties: the back-end server computer (BE) 110, the application store 106 and the user device 102 operated by a user. The user device 102 can be a phone with a secure element (SE). (pBE,sBE) denotes a public/secret (e.g., private) key pair generated at the back-end sever computer 110 and referred to as a server computer public key and a server computer secret key, respectively. (pSE,sSE) denotes a public/secret key pair generated on the secure element 108 of the user device 102 and referred to as a secure element public key and a secure element secret key, respectively.

The computers in FIG. 1 can perform various cryptographic functions. For example, the back-end server computer 110 can perform a SignBE function that signs a value using the server computer secret key. The back-end server computer 110 can also perform a message recovery algorithm RecBE that recovers a signed message based on the server computer public key. The secure element 108 on the user device 102 can perform a SignSE function that signs a value using the secure element secret key. The secure element 108 can also perform a message recovery algorithm RecSE that recovers a signed message based on the secure element public key. Both message recovery algorithms can run on the whitebox program.

$\{x\}_k$ can denote a value x encrypted with the key k. $\{x\}^k$ denotes a value x signed with the key k. Dec[k] denotes an algorithm with the key k hardcoded on it. Comp denotes a compiling algorithm for whitebox programs. More precisely, Comp takes, as input, a (symmetric) master secret key MSK and a public key pK, and returns a whitebox program with both keys embedded in it: WB$\leftarrow_\$$ Comp(MSK, pK). This compiling algorithm can be securely run by the back-end server computer 110.

Figure 2:
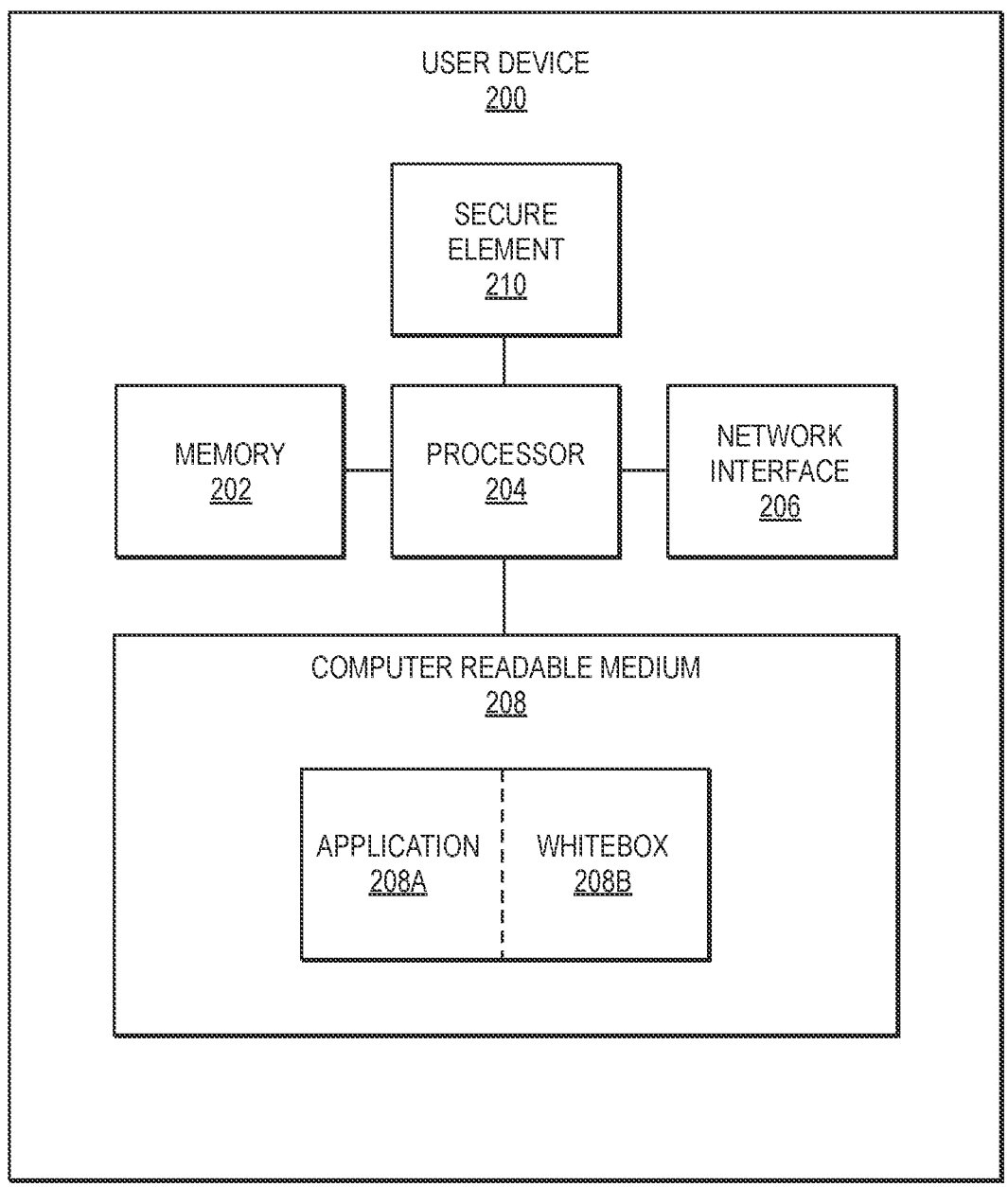
FIG. 2 shows a block diagram illustrating a user device, according to embodiments of the invention.

FIG. 2 shows a block diagram of a user device 200 according to embodiments. The exemplary user device 200 may comprise a processor 204. The processor 204 may be coupled to a memory 202, a network interface 206, a computer readable medium 208, and a secure element 210. The computer readable medium 208 can comprise an application 208A with a whitebox 208B.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store cryptographic keys, interaction data, user identifiers, etc.

The computer readable medium 208 may comprise code, executable by the processor 204, for performing a method comprising: receiving, by a user device, an encrypted message from a back-end server computer, the encrypted message being a message encrypted by the back-end server computer with a master secret key or a key derived from the master secret key; signing, by the user device, using a secure element, the encrypted message with a secure element private key to obtain a signed encrypted message; cryptographically recovering, by the user device, using a whitebox, a secure element public key from a certified key using a back-end server computer public key, the certified key being certified by the back-end server computer and based on at least the secure element public key, and wherein the whitebox also stores the master secret key or the key derived from the master secret key; cryptographically recovering, by the user device, using the whitebox, the encrypted message from the signed encrypted message using the secure element public key; and decrypting, by the user device, using the whitebox, the encrypted message using the master secret key or the key derived from the master secret key in the whitebox to obtain the message.

The application 208A can include code or software, executable by the processor 204, for carrying out a specific task. For example, if the application 208A is an interaction application, then the application 208A can include code or software, executable by the processor 204, for facilitating an interaction, specifically for generating a cryptogram. If the application 208A is a video streaming application, then the application 208A can include code or software, executable by the processor 204, for obtaining video content and displaying the video content to the user of the user device 200.

The whitebox 208B may include code or software, executable by the processor 204, for performing cryptographic operations. The whitebox 208B, in conjunction with the processor 204, can cryptographically recover data from signed data as well as decrypt data using a cryptographic key. For example, the whitebox 208B, in conjunction with the processor 204, can cryptographically recover a secure element public key from a signed secure element public key. If the signed secure element public key is signed with a server computer secret key, then the whitebox 208B, in conjunction with the processor 204, can cryptographically recover the secure element public key from the signed secure element public key using the server computer public key that corresponds to the server computer secret key used to sign the data. The whitebox 208B, in conjunction with the processor 204, can cryptographically recover data from signed data using a public key that corresponds to the secret key used to sign the data using a message recoverable signature process. Further details regarding message recovery can be found in [7] and [8], which are herein incorporated in their entirety for all purposes.

The whitebox 208B, in conjunction with the processor 204, can cryptographically recover an encrypted message from a signed encrypted message. For example, the encrypted message can be signed by the secure element 210 using a secure element secret key. The whitebox 208B, in conjunction with the processor 204, can then recover the encrypted message from the signed encrypted message using a secure element public key that corresponds to the secure element secret key.

The whitebox 208B, in conjunction with the processor 204, can also decrypt the encrypted message. The whitebox 208B can include a master secret key, which is compiled into the whitebox 208B by the back-end server computer. The whitebox 208B, in conjunction with the processor 204, can decrypt the encrypted message using the master secret key to obtain the message.

The network interface 206 may include an interface that can allow the user device 200 to communicate with external computers. The network interface 206 may enable the user device 200 to communicate data to and from another device (e.g., an application store, a back-end server computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The secure element 210 can include a secure hardware component and/or a secure software component. The secure element 210 can be protected from unauthorized access. For example, the secure element can be a tamper-resistant hardware platform such as a chip on a device or can be a tamper-resistant software program such as a virtual or emulated environment.

The secure element 210 can locally generate cryptographic key pairs. For example, the secure element 210 can generate a secure element public key and a secure element secret key. The secure element 210 can also generate a user identifier. Furthermore, the secure element 210 can sign data using a message recoverable signature process. For example, the secure element 210 can sign an encrypted message with the secure element private key to obtain a signed encrypted message, which can then be provided to the whitebox 208B.

Figure 3:
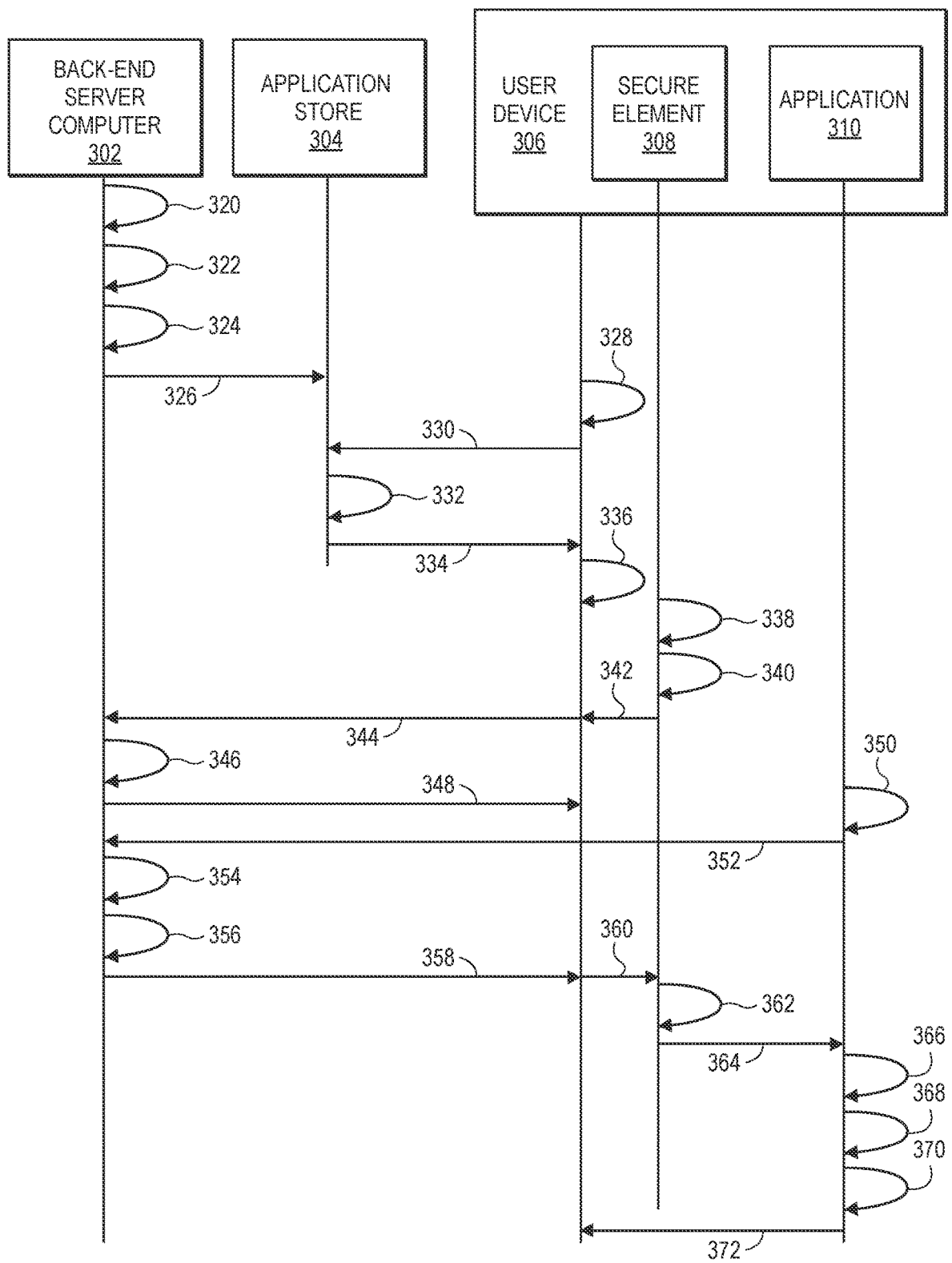
FIG. 3 illustrates a binding and secure message delivery process, according to embodiments of the invention.
Figure 4:
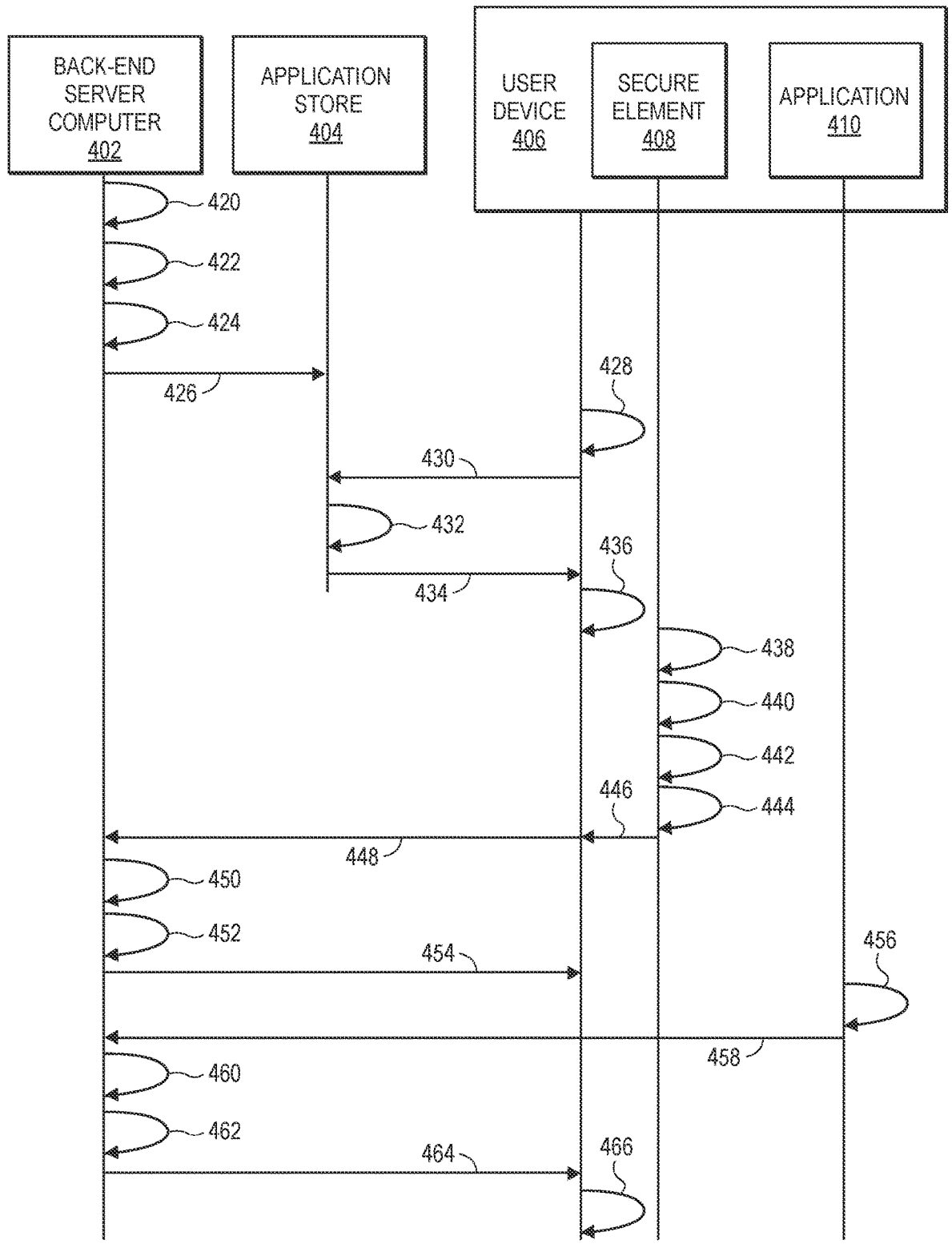
FIG. 4 illustrates a first part of an alternate binding and secure message delivery process second process, according to embodiments of the invention.
Figure 5:
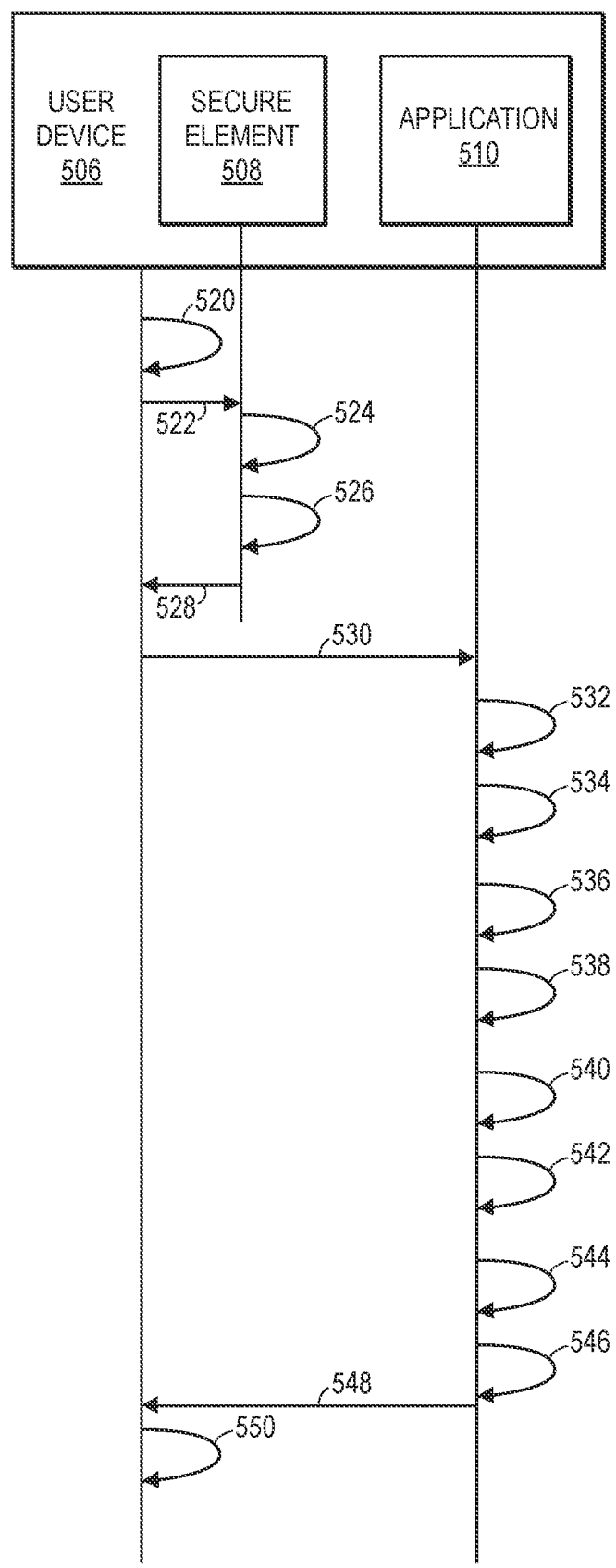
FIG. 5 illustrates a second part of an alternate binding and secure message delivery process second process, according to embodiments of the invention.

Embodiments can use the systems and apparatuses described herein to at least bind a whitebox to a device. FIGS. 3-5 describe some examples of such methods. In some embodiments, the user device 306, 406, and 506 may include the user device 102 or the user device 200 of FIGS. 1 and 2, respectively.

FIG. 3 shows a flowchart of a binding and secure message delivery process method according to embodiments. The method illustrated in FIG. 3 will be described in the context of a device binding for digital rights management. It is understood, however, that the invention can be applied to other circumstances.

As discussed herein, embodiments can include a process in which the back-end server computer can compile a whitebox program once for a secure application (e.g., a DRM application) and store the secure application on an application store 304. Then, every user (e.g., each user that selects to download) can download the same secure application from the application store 304 to their user device (e.g., a user device 306). This way, the back-end server computer 302 does not need to compile a new whitebox for the secure for each new user. The back-end server computer 302 only needs to provide encrypted messages (e.g., content) to each user.

Steps 320-326 can include a setup phase performed by the back-end server computer 302 prior to providing the secure application to the application store 304.

At step 320, the back-end server computer 302 can generate a server computer public key (pBE) and a server computer secret key (sBE). The server computer public key and the server computer secret key can be a cryptographic key pair. In some embodiments, the back-end server computer 302 may have previously generated the server computer public key and the server computer secret key. The back-end server computer 302 can then retrieve the server computer public key and the server computer secret key from secure storage.

At step 322, after generating the server computer public/secret key pair, the back-end server computer 302 can generate a master secret key (MSK). The master secret key can be a symmetric key. The back-end server computer 302 can generate the master secret key in any suitable manner capable of creating a symmetric cryptographic key.

At step 324, after generating the master secret key, the back-end server computer 302 can compile the application. For example, the back-end server computer 302 compiles the uncompiled application comprising the whitebox with the server computer public key and the master secret key embedded into the whitebox program (e.g., WB$\leftarrow_\$$ Comp (MSK,pBE)). In some embodiments, the back-end server computer 302 can obtain an uncompiled application to compile. For example, the back-end server computer 302 can obtain the uncompiled application from a database, a workplace computer, etc. After obtaining the uncompiled application, the back-end server computer can compile the uncompiled application using a compiler, the master secret key, and the server computer public key into the application. Compiling the application can include transforming the application source code, which may be human readable, into machine code, which may be computer executable. In some embodiments, the application can be compiled in a manner such that the server computer public key and the master secret key are obfuscated within the whitebox portion of the application.

As an illustrative example, the application can be a DRM based application. The application can be a video streaming application where a user can select a video in the application when installed on the user device 306, then receive the selected video from the back-end server computer 302.

At step 326, after compiling the application comprising the whitebox, the back-end server computer 302 can provide the application to the application store 304.

Steps 328-334 can include a download phase performed between the user device 306, which is attempting to download the application, and the application store 304.

At step 328, the user device 306 (e.g., using a processor of the user device 306, such as the processor 204 illustrated in FIG. 2) generates a download request message that requests to download the application. The download request message can request an application selected by the user of the user device 306. In some embodiments, the download request message can include a user device identifier.

At step 330, after generating the download request message, the user device 306 can provide the download request message to the application store 304.

At step 332, after receiving the download request message, the application store 304 can process the download request. For example, the application store 304 can determine whether or not the user device 306 is qualified to receive the secure application. For example, the application store 304 can compare the user device identifier to a database comprising a plurality of user device identifiers. If the user device identifier matches a stored user device identifier, then the application store 304 can provide the secure application to the user device 306.

At step 334, after determining to provide the application to the user device 306, the application store 304 can provide the application to the user device 306 in response to the download request message.

Steps 336-366 can include an application initialization and secure message provisioning phase.

At step 336, after receiving the application, the user device 306 can install the application as the application 310. Installing the application can include making the application ready for execution. Installation of the application can be performed by the user device 306 in any suitable manner. In some embodiments, installation can involve the code of the application being copied/generated from installation files (received from the application store 304) to new files on the user device 306 for easier access by the operating system, creating necessary directories, registering environment variables, providing separate program for un-installation etc.

After installing the application 310, the user device 306 can enroll the application 310 with the back-end server computer 302.

At step 338, a secure element 308 on the user device 306 can generate a secure element public key (pSE) and a secure element secret key (sSE). In some embodiments, the user device 306 can prompt the secure element 308 to generate the secure element public key (pSE) and the secure element secret key (sSE). The secure element 308 can generate the secure element public key (pSE) and the secure element secret key (sSE) such that they are unique to the newly installed application (e.g., the application 310). Each different application can be associated with a different secure element public/secret key pair.

At step 340, after generating the secure element public/secret key pair, the secure element 308 (or in some embodiments, the user device 306) can generate an enrollment request message. The enrollment request message can comprise the secure element public key. In some embodiments, the enrollment request message can further comprise the user device identifier.

At step 342, the secure element 308 can provide the enrollment request message to a processor (e.g., element 204 in FIG. 2) of the user device 306. In some embodiments, the secure element 308 can provide the secure element public key to a processor of the user device 306 that is outside of the secure element 301. The user device 306, for example, the processor of the user device 306, can then generate the enrollment request message comprising the secure element public key.

At step 344, the user device 306 can provide the enrollment request message with the secure element public key to the back-end server computer 302. The address (e.g., IP address) of the back end server 302 may have been provided in the application 310.

Once the back-end server computer 302 receives the enrollment request message, the back-end server computer 302 can enroll the application 310 installed on the user device 306 that includes the secure element 308.

At step 346, after receiving the enrollment request message, the back-end server computer 302 can sign the secure element public key. The back-end server computer 302 can sign the secure element public key with the server computer secret key (generated at step 320). Signing the secure element public key with the server computer secret key can be referred to as resulting in encoding a certified key. In particular, the back-end server computer 302 can perform $\{pSE\}^{sBE} \leftarrow (\text{SignBE}(sBE, pSE,))$.

The back-end server computer 302 can sign the secure element public key with the server computer secret key using a message recoverable signature process. Further details regarding message recovery can be found in [7] and [8], which are herein incorporated in their entirety for all purposes.

For example, a message recoverable signature process can allow a signing device (e.g., the back-end server computer 302, etc.) to sign data in such a manner that the signature verifying device (e.g., the application 310, etc.) can obtain the data and verify that the signing device was the device that actually signed the data.

At step 348, after obtaining the signed secure element public key (e.g., a certified key), the back-end server computer 302 can provide the signed secure element public key to the user device 306. In some embodiments, the user device 306 can store the signed secure element public key in memory.

At any suitable point in time after step 348, the user of the user device 306 can utilize the application 310 that is installed on the user device 306 to select content to receive from the back-end server computer 302. For example, the application 310 can be a video streaming application. The user can select a video to watch using the video streaming application. At step 350, the application 310 can receive the selection from the user.

At step 352, after receiving the selection from the user, the application 310 can provide a content request message comprising the selection from the user to the back-end server computer 302.

At step 354, after receiving the content request message, the back-end server computer 302 can obtain a message to securely provide to the application 310. The message can include any data that is to be securely provisioned to the application 310. For example, the message can include content for the application 310. The content can be associated with the selection from the user. The content can include images, videos, gifs, data, etc. In some embodiments, the back-end server computer 302 can obtain the message from a database. In other embodiments, the back-end server computer 302 can generate the message.

As an illustrative example, if the application 310 is a video streaming application, then the back-end server computer 302 can obtain the content, which is a video, that is associated with the video selected by the user in the application 310 on the user device 306. The back-end server computer 302 can obtain the video from a video database.

At step 356, after obtaining the message, the back-end server computer 302 can encrypt the message. The back-end server computer 302 can encrypt the message using the master secret key (MSK) (generated at step 322). This message, including the content, can be referred to as m, and can be, for example, a bit-string of any length. $\{m\}_{MSK}$ denotes the encrypted message m.

At step 358, after encrypting the message, the back-end server computer 302 can provide the encrypted message and the signed secure element public key to the user device 306.

At step 360, after receiving the encrypted message and the signed secure element public key from the back-end server computer 302, the user device 306 can provide the encrypted message from the processor of the user device 306 to the secure element 308 of the user device. The user device 306 can also provide the signed secure element public key to the secure element 308 (e.g., from the processor of the user device 306) if not yet provided to the secure element 308.

At step 362, after receiving the encrypted message ($\{m\}_{MSK}$), the secure element 308 can sign the encrypted message. The secure element 308 can sign the encrypted message with the secure element secret key (generated at step 338). Signing the encrypted message with the secure element secret key results in a signed encrypted message ($\{m\}_{MSK}^{sSE}$). For example, the secure element 308 can perform ($\{m\}_{MSK}^{sSE} \leftarrow \text{SignSE}(sSE|\{m\}_{MSK})$). The secure element 308 can sign the encrypted message with the secure element secret key using a message recoverable signature process.

At step 364, after signing the encrypted message, the secure element 308 can provide the signed encrypted message ($\{m\}_{MSK}^{sSE}$) and the signed secure element public key to the application 310 that includes the whitebox.

At step 366, after receiving the signed encrypted message and the signed secure element public key, the application 310 (e.g., performed by the whitebox of the application 310, such as the whitebox 104B or the whitebox 208B of FIGS. 1 and 2, respectively) can recover (e.g., cryptographically recover) the secure element public key from the signed secure element public key. The whitebox of the application 310 can recover the secure element public key from the signed secure element public key using the server computer public key that corresponds to the sever computer private key that was used to sign the secure element public key at step 346. For example, the whitebox of the application 310 can perform pSE←RecBE(pBE, $\{pSE\}^{sBE}$).

At step 368, after obtaining the secure element public key, the whitebox of the application 310 can recover (e.g., cryptographically recover) the encrypted message from the signed encrypted message. The whitebox of the application 310 can recover the encrypted message from the signed encrypted message using the secure element public key that corresponds to the secure element private key that was used to sign the encrypted message at step 356. For example, the whitebox of the application 310 can perform $\{m\}_{MSK}$←RecSE(pSE, $\{m\}_{MSK}^{sSE}$).

At step 370, after obtaining the encrypted message, the whitebox of the application 310 can decrypt the encrypted message. The whitebox of the application 310 can decrypt the encrypted message using the master secret key (MSK) that was compiled into the whitebox of the application 310 at step 324. The master secret key stored by the whitebox of the application 310 can be the same cryptographic key as the master secret key stored by the back-end server computer 302 (e.g., is a symmetric key). The whitebox of the application 310 can obtain the message by decrypting the encrypted message. For example, the whitebox of the application 310 can perform m←Dec(MSK,$\{m\}_{MSK}$).

At step 372, after obtaining the message from the encrypted message, the application 310 can provide the message to the processor of the user device 306. For example, if the application 310 is a video streaming application, then the application 310 can provide the selected video to the user device 306 (e.g., the processor of the user device) for processing of the video such that the user can watch the video.

The method illustrated in FIG. 3 achieves correctness and the desired security for DRM applications. For example, prior to the enrollment request message being provided to the back-end server computer 302 in step 344, the user (here referred to as a malicious user) will be unable to run their secure application. So any copy of that program made by the malicious user is useless as the copy cannot be run. If the malicious user has enrolled and the malicious user has the obtained the secure element public key signed by the back-end server computer 302 (e.g., $\{pSE\}^{sBE}$), the malicious user will be able to run the secure application. However, the malicious user may not be able to share the secure application with other users who have not enrolled. For example, if the malicious user shares the signed secure element public key and the secure application with another user device, the other user device will not be able to decrypt the messages correctly. This is because the signed secure element public key of the malicious user can only decrypt messages that are signed by the secure element of the malicious user's user device. Any improperly shared copy of the secure application and the signed secure element public key will not allow another user to utilize the secure application, thus preventing code lifting attacks.

In some embodiments, for further security, attestation (e.g., using attestation public/private key pairs) and authentication procedures can be included during enrollment.

FIG. 4 shows a flowchart of an alternate binding and secure message delivery process method according to embodiments. The method illustrated in FIG. 4 will be described in the context of device binding for interaction applications. It is understood, however, that the invention can be applied to other circumstances (e.g., other types of applications, other types of interactions, etc.). For example, the application can be an interaction application, a video streaming application, a data transfer application, a webpage access application, or a social media application.

The method described in reference with FIG. 3 can be suitable for a DRM or application, but greater confidentiality is desirable for mobile interaction applications (e.g., mobile payment applications). For example, in the embodiment in FIG. 3, every user with a valid secure application could decrypt the encrypted messages of any other user. This is because all messages are encrypted with the same master secret key that is a symmetric key held by every secure application regardless of user device. The methods illustrated in FIGS. 4-5 provide for further security beyond the security provided in the method illustrated in FIG. 3 for interaction applications such as payment applications, building access applications, etc.

This alternative method illustrated in FIGS. 4-5 can follow a similar approach as that of the method illustrated in FIG. 3, but can be adapted to achieve confidentiality of messages that include limited use keys for individual users. This can be achieved by linking the encryption of the limited use keys (e.g., in the message m) to an identifier encoded on the secure element of the user device. The identifier and the public key generated by the secure element (pSE) can then, together, be certified by the back-end server computer. The identifier can then be used in conjunction with the master secret key to generate a user specific encryption key for each message comprising limited use key(s). Further details are provided in reference to FIGS. 4-5.

Steps 420-426 can include a setup phase performed by the back-end server computer 402 prior to providing the secure application to the application store 404. Steps 428-434 can include a download phase performed between the user device 406, which is attempting to download the secure application, and the application store 404. Steps 420-434 of FIG. 4 can be similar to steps 320-334 of FIG. 3 and will not be repeated in detail here. Steps 436-466 can include a secure application initialization and secure message provisioning phase.

As an example, the application discussed in FIG. 4 can be an interaction application (e.g., a transaction application such as a payment application, etc.). The interaction application can facilitate an interaction between two parties. For example, the interaction application can facilitate an interaction between the user of the user device 406 and a resource provider of a resource provider computer (not shown). The interaction application can facilitate the interaction by generating secure information for use in the interaction. For example, in some embodiments, the interaction application can generate a cryptogram for use in the interaction.

At step 436, after receiving the application from the application store 404, the user device 406 can install the application as the application 410. The application 410 can include a whitebox that is compiled with the server computer public key and the master secret key.

After installing the application 410 that includes the whitebox, the user device 406 can enroll the application 410 with the back-end server computer 402.

At step 438, a secure element 408 on the user device 406 can generate a secure element public key (pSE) and a secure element secret key (sSE). The secure element 408 can generate the secure element public/secret key pair as described in reference to step 338 of FIG. 3.

At step 440, after generating the secure element public/secret key pair, the secure element 408 can generate a user identifier. The user identifier can be an alphanumeric value that identifies the user, the user device 306, and/or the secure element 308. The user identifier can be a unique value generated by the secure element 308 and can be used during enrollment to identify the secure element 308 to the back-end server computer 302. The secure element 408 can generate a random user identifier using a random number generator. In other embodiments, the user identifier can be a user created value such as a password or biometric.

At step 442, after generating the user identifier, the secure element 408 can generate secure element identification data. In some embodiments, the secure element identification data can be at least a combination of the user identifier and the secure element public key. For example, the secure element 408 can generate the secure element identification data by concatenating the secure element public key with the user identifier. For example, the secure element 408 can perform x=pSE∥ID. The secure element identification data can identify the secure element 408. The secure element identification data can identify the secure element 408 since the secure element identification data includes the public key of the secure element 408 and the user identifier generated by the secure element 408.

At step 444, after generating the secure element identification data, the secure element 408 (or in some embodiments, the user device 406) can generate an enrollment request message comprising the secure element identification data. For example, the enrollment request message can comprise the secure element public key and the user identifier.

At step 446, the secure element 408 can provide the enrollment request message to a processor (e.g., the processor 204 illustrated in FIG. 2) of the user device 406 that is outside of the secure element 408. In some embodiments, the secure element 408 can provide the secure element identification data to the processor of the user device 406, where the user device 406 then generates the enrollment request message comprising the secure element identification data.

At step 448, the user device 406 can provide the enrollment request message to the back-end server computer 402.

At step 450, after receiving the enrollment request message, the back-end server computer 402 can sign the secure element identification data with the server computer secret key (sBE). Signing the secure element identification data with the server computer secret key results in encoding a certified key. In particular, the back-end server computer 402 can perform $\{x\}^{sBE} \leftarrow \text{SignBE}(sBE, x)$. The back-end server computer 402 can sign the secure element identification data with the server computer secret key using a message recoverable signature process.

At step 452, after signing the secure element identification data, the back-end server computer 402 can derive a derived key. The derived key can be derived using the master secret key (MSK) and the user identifier (ID) obtained from the secure element identification data. The back-end server computer 402 can input the master secret key and the user identifier into a key derivation function (KDF) to obtain the derived key (k). For example, the back-end server computer 402 can perform k←KDF(MSK, ID).

At step 454, after creating the derived key, the back-end server computer 402 can provide the signed secure element identification data to the user device 406. In some embodiments, the user device 406 can store the signed secure element identification data in memory.

At any suitable point in time after step 454, the user of the user device 406 can utilize the application 410 to select to receive content from the back-end server computer 402. For example, the application 410 can be an interaction application. The application 410 can request content from the back-end server computer 402 prior to or during an interaction. The content requested from the back-end server computer 402, by the interaction application, can include limited use keys (LUKs). For example, the user can initiate an interaction with a resource provider to obtain a resource. During the interaction, the application 410 can request a limited use key from the back-end server computer 402.

At step 456, the application 410 generate a request for content (e.g., a limited use key). In some embodiments, the request for content can include the user device identifier or any other suitable data.

At step 458, the application 410 can provide the request for content to the back-end server computer 402.

At step 460, the back-end server computer 402 can generate the message including the content that is to be provided to the application 410. The message can include, for example, one or more limited use keys (LUKs). The back-end server computer 402 can generate the one or more limited use keys. In some embodiments, the back-end server computer 302 can obtain the limited use keys from a database. In other embodiments, the back-end server computer 302 can generate the limited use keys.

At step 462, after obtaining the message comprising the limited use keys, the back-end server computer 402 can encrypt the message. The back-end server computer 402 can encrypt the message using the derived key (k) (generated at step 452). This message (e.g., limited use keys) can be referred to as LUK, and can be, for example, a bit-string of any length. $\{LUK\}_k$ denotes the encrypted limited use key(s) LUK.

At step 464, after generating the encrypted message, the back-end server computer 402 can provide the encrypted message and the signed secure element identification data to the user device 406.

In some embodiments, at step 466, after receiving the encrypted message and the signed secure element identification data, the user device 406 can store the encrypted message and the signed secure element identification data for use in an interaction if the encrypted message is received prior to an interaction. In some embodiments, the signed secure element identification data can be store in the memory of the user device 406. In other embodiments, the processor of the user device 406 can provide the signed secure element identification data to the secure element 408 for storage.

FIG. 5 illustrates a method of utilizing the encrypted message and the signed secure element identification data for use in an interaction.

At step 520, the user device 506 can obtain interaction data for the interaction with the resource provider of the resource provider computer (not shown). Interaction data might include data relating to one or more items to purchase from a resource provider such as a merchant, or data relating to the ability of the user device to access a secure location or secure data.

During the interaction, the application 510 on the user device 506 can generate a cryptogram. Steps 522-546 describe the secure creation of the cryptogram using the encrypted message and the signed secure element identification data received in FIG. 4.

At step 522, the processor of the user device 506 can provide the encrypted message, which was received by the user device 506 at step 464 in FIG. 4, to the secure element 508.

At step 524, after receiving the encrypted message (e.g., the encrypted limited use key(s)), the secure element 508 can determine an authentication message (y). The secure element 508 can determine the authentication message using the encrypted message and the user identifier. For example, the secure element 508 can concatenate the encrypted limited use key with the user identifier. For example, the secure element 508 can perform $y \leftarrow \{LUK\}_k \| ID$.

At step 526, after generating the authentication message (y), the secure element 508 can sign the authentication message. The secure element 508 can sign the authentication message with the secure element secret key. For example, the secure element 508 can perform $\{y\}^{sSE} \leftarrow SignSE(sSE, y)$. By signing the encrypted message, the application 510 can later verify that the application 510 is communicating with the correct user device 506 and secure element 508, as discussed in further detail below.

At step 528, after signing the authentication message, the secure element 508 can provide the signed authentication message to processor of the user device 506, which is external to the secure element 508.

At step 530, after obtaining the signed authentication message, the processor of the user device 506 can provide the signed secure element identification data (signed by the back-end server computer), the signed authentication message (signed by the secure element 508), and the interaction data (obtained at step 520) to the application 510.

At step 532, after receiving the signed secure element identification data ($\{x\}^{sBE}$), the signed authentication message ($\{y\}^{sSE}$), and the interaction data, the whitebox of the application 510 can recover (e.g., cryptographically recover) the secure element identification data from the signed secure element identification data. For example, the whitebox of the application 510 can perform $x \leftarrow vRec(pBE, \{x\}^{sBE})$.

At step 534, after obtaining the secure element identification data (x), the whitebox of the application 510 can determine the secure element public key and the user identifier from the secure element identification data. For example, the secure element identification data may be formed from concatenating the secure element public key and the user identifier. As such, the whitebox of the application 510 can extract the secure element public key and the user identifier out of the secure element identification data. For example, the whitebox of the application 510 can perform $pSE \| \overline{ID} \leftarrow x$. The user identifier that is extracted from the secure element identification data can be an enrollment user identifier $\overline{ID}$, as this user identifier was provided to the back-end server computer during enrollment.

At step 536, after obtaining the secure element public key and the user identifier, the whitebox of the application 510 can recover (e.g., cryptographically recover) the authentication message (y) from the signed authentication message ($\{y\}^{sSE}$). For example, the whitebox of the application 510 can perform $y \leftarrow vDec(pSE, \{y\}^{sSE})$.

At step 538, after recovering the authentication message (y), the whitebox of the application 510 can determine the encrypted limited use key and the user identifier from the authentication message. For example, the authentication message may be formed from concatenating the encrypted limited use key and the user identifier. As such, the whitebox of the application 510 can extract the encrypted limited use key and the user identifier out of the authentication message. For example, the whitebox of the application 510 can perform $\{LUK\}k \| \widetilde{ID} \leftarrow y$. The user identifier that is extracted from the authentication message can be an authentication user identifier $\widetilde{ID}$, as this user identifier was received from the secure element during the interaction for authentication of the secure element and user.

At step 540, after obtaining the encrypted limited use key and the user identifier, the whitebox of the application 510 can determine whether or not the two extracted user identifiers match. Specifically, the whitebox of the application 510 can compare the enrollment user identifier $\overline{ID}$ and the authentication user identifier $\widetilde{ID}$. For example, the application 510 can perform if $\overline{ID} == \widetilde{ID}$. If the enrollment user identifier ID matches the authentication user identifier $\widetilde{ID}$, then the whitebox of the application 510 can proceed to step 542. If the enrollment user identifier $\overline{ID}$ does not matches the authentication user identifier $\widetilde{ID}$, then the whitebox of the application 510 can terminate the process.

At step 542, if the enrollment user identifier $\overline{ID}$ matches the authentication user identifier $\widetilde{ID}$, the whitebox of the application 510 can derive a derived key k. The derived key can be derived using the master secret key (MSK), stored in the whitebox of the application 510, and the user identifier (ID). The whitebox of the application 510 can derive the derived key in the same manner as derived by the back-end server computer at step 452 in FIG. 4. For example, the whitebox of the application 510 can derive the derived key using a key derivation function. The whitebox of the application 510 can input the master secret key and the user identifier into the key derivation function. The key derivation function can be the same key derivation function utilized by the back-end server computer. For example, the whitebox of the application 510 can perform k←KDF(MSK, ID).

At step 544, after determining the derived key k, the whitebox of the application 510 can decrypt the encrypted limited use key $\{LUK\}_k$. The whitebox of the application 510 can decrypt the encrypted limited use key $\{LUK\}_k$ using the derived key k to obtain the limited use key LUK. For example, the whitebox of the application 510 can perform LUK←Dec(k,$\{LUK\}_k$).

At step 546, after decrypting the encrypted limited use key $\{LUK\}_k$, the whitebox of the application 510 can generate a cryptogram AC for the interaction. The whitebox of the application 510 can generate the cryptogram using the limited use key LUK and the transaction data (m). The whitebox of the application 510 can generate the cryptogram in any suitable manner. For example, the whitebox of the application 510 can generate the cryptogram using a message authentication code (MAC) function. For example, the whitebox of the application 510 can perform AC←Mac (LUK,m).

At step 548, after generating the cryptogram AC, the application 510 can provide (e.g., output) the cryptogram to the processor of the user device 506.

At step 550, after receiving the cryptogram AC from the application 510, the user device 506 can continue with the interaction using the cryptogram. For example, the user device 506 can utilize the cryptogram in the interaction. The user device 506 can provide the cryptogram along with the interaction data and/or any other suitable data involve in the interaction to the resource provider computer (not shown). The resource provider computer can generate an authorization request message including the cryptogram and the interaction data. For example, in order to authorize the interaction, the authorization request message may be provided to a transport (e.g., acquirer) computer. The authorization request message is then sent to a processing network computer. In some embodiments, the processing network computer can verify the cryptogram. If the cryptogram is valid, the processing network computer can forward the authorization request message to the corresponding authorizing entity computer associated with an authorizing entity associated with the user.

After the authorizing entity computer receives the authorization request message, the authorizing entity computer sends an authorization response message back to the processing network computer to indicate whether the current interaction is authorized (or not authorized). The processing network computer then forwards the authorization response message back to the transport computer. In some embodiments, the processing network computer can decline the interaction even if the authorizing entity computer 150 has authorized the interaction. The transport computer then sends the response message back to the resource provider computer.

After the resource provider computer receives the authorization response message, the resource provider computer may then provide the authorization response message to the user device 506. The response message may be displayed by the user device 506, displayed by the resource provider computer to the user, or may be printed out on a physical receipt. Alternately, if the interaction is an online interaction, the resource provider computer may provide a web page or other indication of the authorization response message as a virtual receipt. The receipts may include the interaction data for the interaction.

The methods illustrated in FIGS. 4-5 can achieve the confidentiality property with the use of the user identifier stored in the secure element. When signing the secure element public key, the back-end server computer appends the ID value to the signed message. Similarly when signing the encrypted limited use key, the secure element appends an ID value to the limited use key. The secure application checks if the user identifiers of the two signed messages are the same, and in that case a correct decryption can be performed. Only a user with access to the secure element can be able to generate such valid signed messages. Thus, the signing algorithms can achieve a property of integrity.

Embodiments of the disclosure have a number of advantages. For example, embodiments prevent a malicious party from performing a code-lifting attack. Embodiments improve upon prior methods and systems by introducing schemes which give device and authentication binding when distributing a single global whitebox that suitable for all users. This is done, for example, by binding the application including the whitebox to a particular user device with a secure element. The application is bound to the user device by having the application verify signatures of received data, where the signatures are created by the back-end server computer and the secure element.

REFERENCES

[1] Estuardo Alpirez Bock et al., On the security goals of whitebox cryptography. Cryptology ePrint Archive, Report 2020/104, 2020. https://eprint.iacr.org/2020/104
[2] Estuardo Alpirez Bock et al., Security reductions for whitebox key-storage in mobile payments. Cryptology ePrint Archive, Report 2019/1014, 2019. https://eprint.iacr.org/2019/1014
[3] Dan Boneh and Brent Waters, *Proceedings of the 13th ACM Conference on Computer and Communications Security, CCS* 2006, Alexandria, VA, USA, October 30-Nov. 3, 2006, pages 211-220. ACM, 2006
[4] Stanley Chow et al., *Selected Areas in Cryptography*, pages 250-270, Berlin, Heidelberg, 2003. Springer Berlin Heidelberg
[5] Stanley Chow et al., Security and Privacy in Digital Rights Management, ACM CCS-9 Workshop, DRM 2002, Washington, DC, USA, Nov. 18, 2002, Revised Papers, volume 2696 of *Lecture Notes in Computer Science*, pages 1-15. Springer, 2002
[6] Cécile Delerablée et al., Selected Areas in Cryptography—SAC 2013—20th International Conference, Burnaby, BC, Canada, Aug. 14-16, 2013, Revised Selected Papers, volume 8282 of *Lecture Notes in Computer Science*, pages 247-264. Springer, 2013
[7] International Organization for Standardization. (2010). *Information technology—Security techniques—Digital signature schemes giving message recovery—Part 2: Integer factorization based mechanisms* (ISO/IEC Standard No. 9796-2:2010). iso.org/standard/54788.html
[8] International Organization for Standardization. (2013). *Information technology—Security techniques—Digital signature schemes giving message recovery—Part 3: Discrete logarithm based mechanisms* (ISO/IEC Standard No. 9796-3:2006). iso.org/standard/42228.html Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a user device, an encrypted message from a back-end server computer, the encrypted message being a message encrypted by the back-end server computer with a master secret key or a key derived from the master secret key;
   signing, by the user device, using a secure element, the encrypted message with a secure element private key to obtain a signed encrypted message;
   cryptographically recovering, by the user device, using a whitebox, a secure element public key from a certified key using a back-end server computer public key, the certified key being certified by the back-end server computer and based on at least the secure element public key, and wherein the whitebox also stores the master secret key or the key derived from the master secret key;
   cryptographically recovering, by the user device, using the whitebox, the encrypted message from the signed encrypted message using the secure element public key; and
   decrypting, by the user device, using the whitebox, the encrypted message using the master secret key or the key derived from the master secret key in the whitebox to obtain the message.

2. The method of claim 1 further comprising:
   installing, by the user device, an application comprising the whitebox onto the user device, wherein the whitebox securely includes the master secret key and the back-end server computer public key;
   generating, by the user device, using the secure element on the user device, the secure element public key and the secure element private key;
   transmitting, by the user device, an enrollment message including the secure element public key to the back-end server computer associated with the application, wherein the back-end server computer signs the secure element public key with a back-end server computer private key to form the certified key, encrypts the message with the master secret key or the key derived from the master secret key to obtain the encrypted message, and provides the encrypted message to the user device; and
   receiving, by the user device, the certified key from the back-end server computer.

3. The method of claim 2 further comprising:
   prior to transmitting the enrollment message, obtaining, by the user device, using the secure element on the user device, a user identifier, and wherein transmitting the enrollment message further comprises:
      transmitting, by the user device, the enrollment message to the back-end server computer, wherein the enrollment message includes the secure element public key and the user identifier, wherein the back-end server computer signs a combination of the secure element public key and the user identifier with the back-end server computer private key to form the certified key, encrypts the message with the master secret key or the key derived from the master secret key to obtain the encrypted message, and provides the encrypted message to the user device.

4. The method of claim 3, wherein the user identifier is an enrollment user identifier, wherein the certified key is signed secure element identification data, and wherein signing the encrypted message further comprises:
   determining, by the user device, using the secure element, an authentication message using the encrypted message and an authentication user identifier; and
   signing, by the user device, using the secure element, the authentication message with the secure element private key to form a signed authentication message,
   wherein cryptographically recovering the secure element public key from the certified key comprises:
      cryptographically recovering, by the user device, using the whitebox, the secure element identification data from the certified key;
      obtaining, by the user device, using the whitebox, the secure element public key and the enrollment user identifier; and
   wherein cryptographically recovering the encrypted message from thesigned encrypted message comprises:
      cryptographically recovering, by the user device, using the whitebox, the authentication message from the signed authentication message; and
      obtaining, by the user device, using the whitebox, the encrypted message and the authentication user identifier from the authentication message; and wherein decrypting the encrypted message comprises:
comparing, by the user device, using the whitebox, the authentication user identifier to the enrollment user identifier;
if the authentication user identifier and the enrollment user identifier match, generating, by the user device, using the whitebox, the key derived from the master secret key and the authentication user identifier or the enrollment user identifier; and
decrypting, by the user device, using the whitebox, the encrypted message with the key derived from the master secret key.

5. The method of claim 4, wherein the message includes a limited use key, wherein the limited use key is encrypted by the back-end server computer using the key derived from the master secret key that is created by the back-end server computer with the enrollment user identifier and the master secret key using a key derivation function.

6. The method of claim 4, wherein the application is an interaction application, a video streaming application, a data transfer application, a webpage access application, or a social media application.

7. The method of claim 4 further comprising:
obtaining, by the user device, interaction data for an interaction between a user of the user device and a resource provider of a resource provider computer, wherein a limited use key is used to form a cryptogram that is used in the interaction.

8. The method of claim 7 further comprising:
generating, by the user device, using the whitebox, the cryptogram for the interaction based on the limited use key and the interaction data.

9. The method of claim 2, wherein prior to installing the application comprising the whitebox onto the user device, the method further comprises:
generating, by the user device, a download request message that requests to download the application;
providing, by the user device, the download request message to an application store; and
receiving, by the user device, the application from the application store in response to the download request message.

10. The method of claim 1, wherein the master secret key is a symmetric key generated by the back-end server computer.

11. A user device comprising:
a processor; and
a computer-readable medium coupled to the processor, the computer-readable medium comprising code executable by the processor for implementing a method comprising:
receiving an encrypted message from a back-end server computer, the encrypted message being a message encrypted by the back-end server computer with a master secret key or a key derived from the master secret key;
signing, using a secure element, the encrypted message with a secure element private key to obtain a signed encrypted message;
cryptographically recovering, using a whitebox, a secure element public key from a certified key using a back-end server computer public key, the certified key being certified by the back-end server computer;
cryptographically recovering, using the whitebox, the encrypted message from the signed encrypted message using the secure element public key; and decrypting, using the whitebox, the encrypted message using the master secret key or the key derived from the master secret key to obtain the message.

12. The user device of claim 11, wherein the method further comprises:
installing an application comprising the whitebox onto the user device, wherein the whitebox securely includes the master secret key and the back-end server computer public key;
generating using the secure element on the user device, the secure element public key and the secure element private key;
transmitting an enrollment message including the secure element public key to the back-end server computer associated with the application, wherein the back-end server computer signs the secure element public key with a back-end server computer private key to form the certified key, encrypts the message with the master secret key or the key derived from the master secret key to obtain the encrypted message, and provides the encrypted message to the user device; and
receiving the certified key from the back-end server computer.

13. The user device of claim 12, wherein the method further comprises:
prior to transmitting the enrollment message, obtaining, by the user device, using the secure element on the user device, a user identifier, and wherein transmitting the enrollment message further comprises:
transmitting, by the user device, the enrollment message to the back-end server computer, wherein the enrollment message includes the secure element public key and the user identifier, wherein the back-end server computer signs a combination of the secure element public key and the user identifier with the back-end server computer private key to form the certified key, encrypts the message with the master secret key or the key derived from the master secret key to obtain the encrypted message, and provides the encrypted message to the user device.

14. The user device of claim 13,
wherein the user identifier is an enrollment user identifier, wherein the certified key is signed secure element identification data, and wherein signing the encrypted message further comprises:
determining, by the user device, using the secure element, an authentication message using the encrypted message and an authentication user identifier; and
signing, by the user device, using the secure element, the authentication message with the secure element private key to form a signed authentication message,
wherein cryptographically recovering the secure element public key from the certified key comprises:
cryptographically recovering, by the user device, using the whitebox, the secure element identification data from the certified key;
obtaining, by the user device, using the whitebox, the secure element public key and the enrollment user identifier; and
wherein e) cryptographically recovering the encrypted message from the signed encrypted message comprises:
cryptographically recovering, by the user device, using the whitebox, the authentication message from the signed authentication message; and obtaining, by the user device, using the whitebox, the encrypted message and the authentication user identifier from the authentication message; and wherein decrypting the encrypted message comprises:
comparing, by the user device, using the whitebox, the authentication user identifier to the enrollment user identifier;
if the authentication user identifier and the enrollment user identifier match, generating, by the user device, using the whitebox, the key derived from the master secret key and the authentication user identifier or the enrollment user identifier; and
decrypting, by the user device, using the whitebox, the encrypted message with the key derived from the master secret key.

15. The user device of claim 12, wherein the back-end server computer signs the secure element public key with the back-end server computer private key using a message recoverable signature process.

16. The user device of claim 11, wherein the user device is a mobile phone.

17. The user device of claim 11, wherein the secure element is on the user device and is in communication with the processor.

18. The user device of claim 11, wherein the whitebox is on the computer readable medium, and wherein the message is encrypted with the master secret key.

19. A method comprising:
obtaining, by a back-end server computer, a message comprising content to provide to an application installed on a user device;
encrypting, by the back-end server computer, the message with a master secret key or a key derived from the master secret key to obtain an encrypted message; and
providing, by the back-end server computer, the encrypted message to the user device, wherein the user device, using a secure element, signs the encrypted message with a secure element private key to obtain a signed encrypted message, cryptographically recovers, using a whitebox in the application, a secure element public key from a certified key using a back-end server computer public key, cryptographically recovers, using the whitebox, the encrypted message from the signed encrypted message using the secure element public key, and decrypts, using the whitebox, the encrypted message using the master secret key or the key derived from the master secret key to obtain the message.

20. The method of claim 19 further comprising:
prior to obtaining the message, generating, by the back-end server computer the back-end server computer public key and a back-end server computer private key;
generating, by the back-end server computer, the master secret key;
obtaining, by the back-end server computer, an uncompiled application to compile;
compiling, by the back-end server computer, the uncompiled application, the master secret key, and the back-end server computer public key into the application;
providing, by the back-end server computer, the application to an application store;
receiving, by the back-end server computer, an enrollment message including the secure element public key from the user device that has installed the application compiled by the back-end server computer;
signing, by the back-end server computer, the secure element public key with the back-end server computer private key to form the certified key; and
providing, by the back-end server computer, the certified key to the user device.

* * * * *